US011946561B2

(12) United States Patent
Sadiku et al.

(10) Patent No.: US 11,946,561 B2
(45) Date of Patent: Apr. 2, 2024

(54) SOLENOID VALVE FOR A MOTOR VEHICLE AND METHOD FOR PRODUCING A MOVEMENT UNIT FROM AN ARMATURE AND A VALVE UNIT FOR A SOLENOID VALVE OF THIS KIND

(71) Applicant: PIERBURG GMBH, Neuss (DE)

(72) Inventors: Besart Sadiku, Cologne (DE); Max Hermann, Neuss (DE); Julian Schumacher, Cologne (DE); Sami Aydan, Cologne (DE); Dominik Nieborg, Neuss (DE)

(73) Assignee: PIERBURG GMBH, Neuss (DE)

( * ) Notice: Subject to any disclaimer, the term of this patent is extended or adjusted under 35 U.S.C. 154(b) by 15 days.

(21) Appl. No.: 17/642,708

(22) PCT Filed: Sep. 16, 2019

(86) PCT No.: PCT/EP2019/074719
§ 371 (c)(1),
(2) Date: Mar. 14, 2022

(87) PCT Pub. No.: WO2021/052560
PCT Pub. Date: Mar. 25, 2021

(65) Prior Publication Data
US 2022/0325816 A1   Oct. 13, 2022

(51) Int. Cl.
*F16K 31/06* (2006.01)
*F16K 1/36* (2006.01)
*F16K 27/02* (2006.01)

(52) U.S. Cl.
CPC .......... *F16K 31/0655* (2013.01); *F16K 1/36* (2013.01); *F16K 27/029* (2013.01); *F16K 31/0651* (2013.01); *F16K 31/0693* (2013.01)

(58) Field of Classification Search
CPC .... F16K 31/0693; F16K 39/022; H01F 7/127; H01F 7/1607
(Continued)

(56) References Cited

U.S. PATENT DOCUMENTS 3,472,483 A * 10/1969 Janczur ............... F16K 31/0693
251/214
4,783,044 A   11/1988 Ellison
(Continued)

FOREIGN PATENT DOCUMENTS

CN        105179791 A    12/2015
DE   10 2011 056 096 A1   6/2013
(Continued)

*Primary Examiner* — Matthew W Jellett
(74) *Attorney, Agent, or Firm* — Norman B. Thot

(57) ABSTRACT

A solenoid valve for a motor vehicle. The solenoid valve includes a housing having an inlet and an outlet, a flow cross-section formed between the inlet and the outlet, a valve seat which surrounds the flow cross-section, a valve unit having an axial contact surface, a coupling member, and a control body, an electromagnetic actuator having an armature with a first axial end which bears against the axial contact surface of the valve unit, a second axial end, and an axial through bore through which the coupling member of the valve unit projects so as to be movable with the armature, and a fastening element which bears on the second axial end of the armature and which is fixedly connected to the coupling member of the valve unit. The valve unit is set down on the valve seat and is lifted from the valve seat.

27 Claims, 2 Drawing Sheets

(58) Field of Classification Search
USPC ........ 251/129.07, 129.15; 335/261, 262, 264
See application file for complete search history.

(56) References Cited

U.S. PATENT DOCUMENTS

| | | | | |
|---|---|---|---|---|
| 5,402,093 | A * | 3/1995 | Gibas | H01F 7/081 335/262 |
| 5,961,052 | A * | 10/1999 | Coldren | F02M 57/02 239/90 |
| 5,967,487 | A * | 10/1999 | Cook | F16K 31/0693 251/64 |
| 6,182,943 | B1 | 2/2001 | Steinrück et al. | |
| 6,315,268 | B1 * | 11/2001 | Cornea | H01F 7/081 137/625.68 |
| 6,578,606 | B2 * | 6/2003 | Neuhaus | G05D 16/2024 137/625.68 |
| 6,679,567 | B1 * | 1/2004 | Tackett | B60T 8/363 303/119.2 |
| 7,069,951 | B2 * | 7/2006 | Cornea | F16K 31/0613 137/625.68 |
| 8,979,066 | B2 * | 3/2015 | Pfetzer | B29C 45/1676 335/262 |
| 9,086,042 | B2 * | 7/2015 | Filippi | F16K 29/00 |
| 10,041,396 | B2 * | 8/2018 | Lenk | F16K 1/46 |
| 11,181,204 | B2 * | 11/2021 | Bonanno | F16K 31/0686 |
| 2009/0301081 | A1 * | 12/2009 | Thiery | F16K 31/0693 60/602 |
| 2011/0049405 | A1 * | 3/2011 | Bill | H01F 7/1607 251/129.15 |
| 2013/0134339 | A1 * | 5/2013 | Miura | F16K 31/0655 251/337 |
| 2013/0313455 | A1 | 11/2013 | Bittner | |
| 2018/0003313 | A1 | 1/2018 | Sciinelker et al. | |
| 2018/0258864 | A1 | 9/2018 | Marocchini et al. | |
| 2020/0347955 | A1 * | 11/2020 | Bonanno | F16K 39/022 |
| 2021/0080021 | A1 * | 3/2021 | Bonanno | F16K 27/029 |

FOREIGN PATENT DOCUMENTS

| | | |
|---|---|---|
| DE | 10 2012 010 140 A1 | 11/2013 |
| DE | 10 2015 101 477 A1 | 8/2016 |
| EP | 1 717 501 A1 | 11/2006 |
| EP | 3 263 962 A1 | 1/2018 |
| EP | 3 372 809 A1 | 9/2018 |
| GB | 2 334 552 A | 8/1999 |

* cited by examiner

SOLENOID VALVE FOR A MOTOR VEHICLE AND METHOD FOR PRODUCING A MOVEMENT UNIT FROM AN ARMATURE AND A VALVE UNIT FOR A SOLENOID VALVE OF THIS KIND

CROSS REFERENCE TO PRIOR APPLICATIONS

This application is a U.S. National Phase application under 35 U.S.C. § 371 of International Application No. PCT/EP2019/074719, filed on Sep. 16, 2019. The International Application was published in German on Mar. 25, 2021 as WO 2021/052560 A2 under PCT Article 21(2).

FIELD

The present invention relates to a solenoid valve for a motor vehicle with a housing having an inlet and an outlet, a flow cross-section formed between the inlet and the outlet and surrounded by a valve seat, a valve unit with a coupling member and a control body, which can be set down on the valve seat and lifted from the valve seat, and an electromagnetic actuator with an armature having an axial through-bore into which the coupling member of the valve unit projects, which can be moved with the armature, as well as a method for producing a moving unit consisting of an armature and a valve unit for such a solenoid valve.

BACKGROUND

Such solenoid valves can be used in a variety of ways. Such solenoid valves are in particular used as a coolant valve for shutting off or for releasing a coolant flow in a cooling circuit of a motor vehicle. Such a solenoid coolant valve usually has a control body made of a plastic material which must be connected to a magnetizable armature, which is usually made of a metal, in order to obtain a motion coupling, which results in the control body being able to be lowered onto or lifted off a valve seat by energizing the electromagnet. The coupling of the control body to the armature can be achieved via coupling members and non-positive or positive connections, whereby the material of the coupling member can either be metal or plastic. It is, for example, known to design the control body with an axial protrusion which is fixed in a bore of the armature via a press-fit connection.

For example, DE 10 2012 010 140 A1 describes a solenoid divert-air valve in which the closing body is connected to the armature via a ball head connection. To reduce switching times, this valve has through-holes in the control body as well as in the armature, so that pressure equalization is achieved between the side of the control body facing the valve seat and the side of the movement unit consisting of control body and armature facing away from the valve seat. An unintentional opening of the valve in case of an increased total pressure in the inlet port of the valve device is thereby prevented and an insensitivity to pulsations is thereby achieved. The connection of the armature to the control body is, however, quite complex to produce because the metallic armature must first be machined in detail to produce the ball head and to produce the through holes. It also has a high weight compared to plastic parts, which also means a higher moment of inertia, which leads to greater necessary actuating forces.

There is accordingly the disadvantage that the known solenoid valves are too heavy, especially in the area of the movement unit consisting of the armature and the control body, and are too expensive to manufacture, especially if pressure compensation is to be provided at the movement unit.

SUMMARY

An aspect of the present invention is to provide a solenoid valve which is suitable as a coolant valve as well as a method for manufacturing a solenoid valve or the movement unit of the solenoid valve, with which the costs for manufacturing and the weight of the valve can be reduced and which also has a pressure compensation via the movement unit in order to be able to reduce the actuating times and necessary actuating forces.

In an embodiment, the present invention provides a solenoid valve for a motor vehicle. The solenoid valve includes a housing comprising an inlet and an outlet, a flow cross-section which is formed between the inlet and the outlet, a valve seat which surrounds the flow cross-section, a valve unit comprising an axial contact surface, a coupling member, and a control body, an electromagnetic actuator comprising an armature which comprises a first axial end which bears against the axial contact surface of the valve unit, a second axial end, and an axial through bore which is configured to have the coupling member of the valve unit project therethrough so as to be movable with the armature, and a fastening element which is configured to bear on the second axial end of the armature and which is fixedly connected to the coupling member of the valve unit. The valve unit is configured to be set down on the valve seat and to be lifted from the valve seat.

BRIEF DESCRIPTION OF THE DRAWINGS

The present invention is described in greater detail below on the basis of embodiments and of the drawings in which.

DETAILED DESCRIPTION

Figure 1:
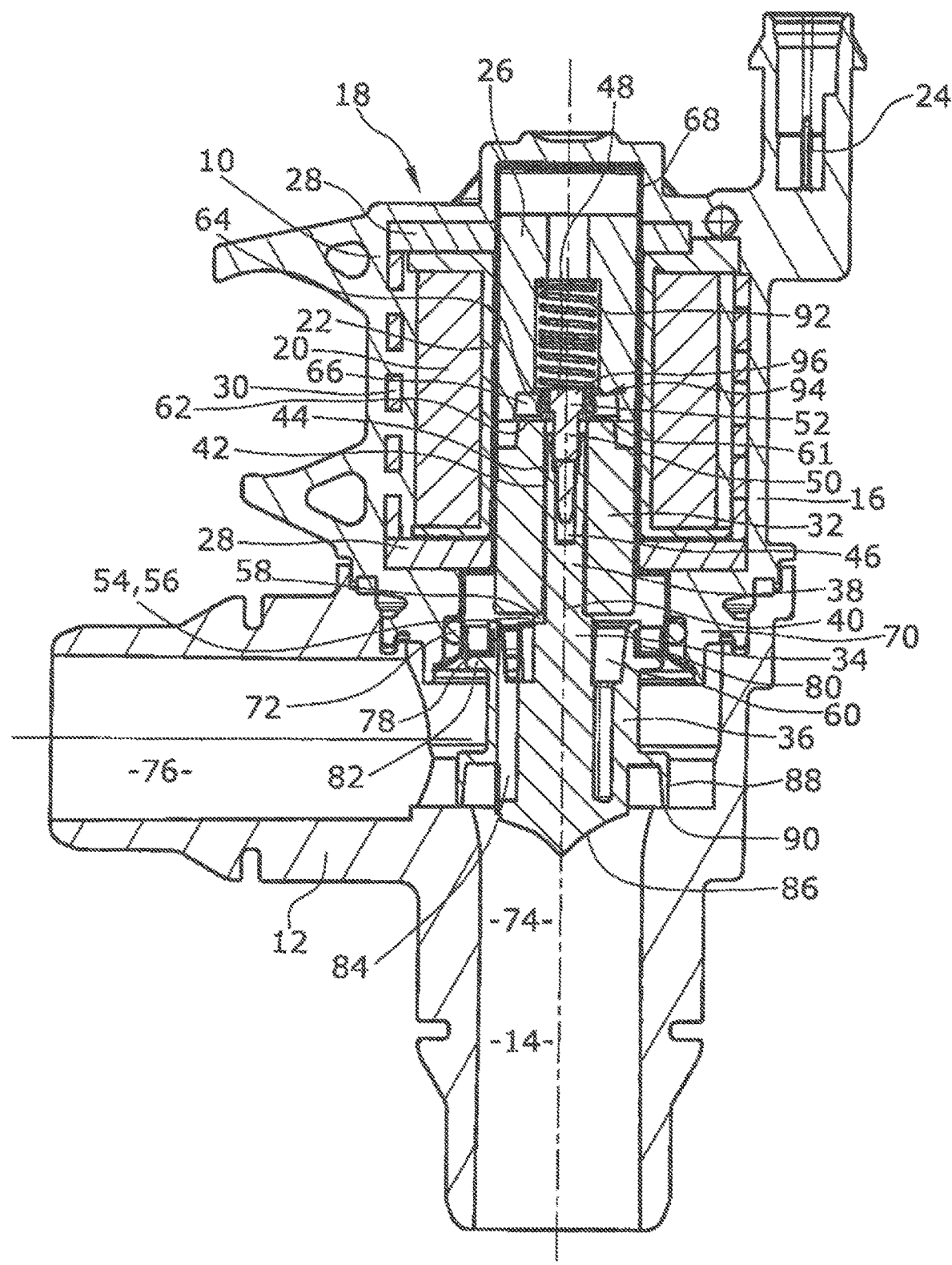
FIG. 1 shows a side view of a solenoid valve according to the present invention in sectional view.
Figure 2:
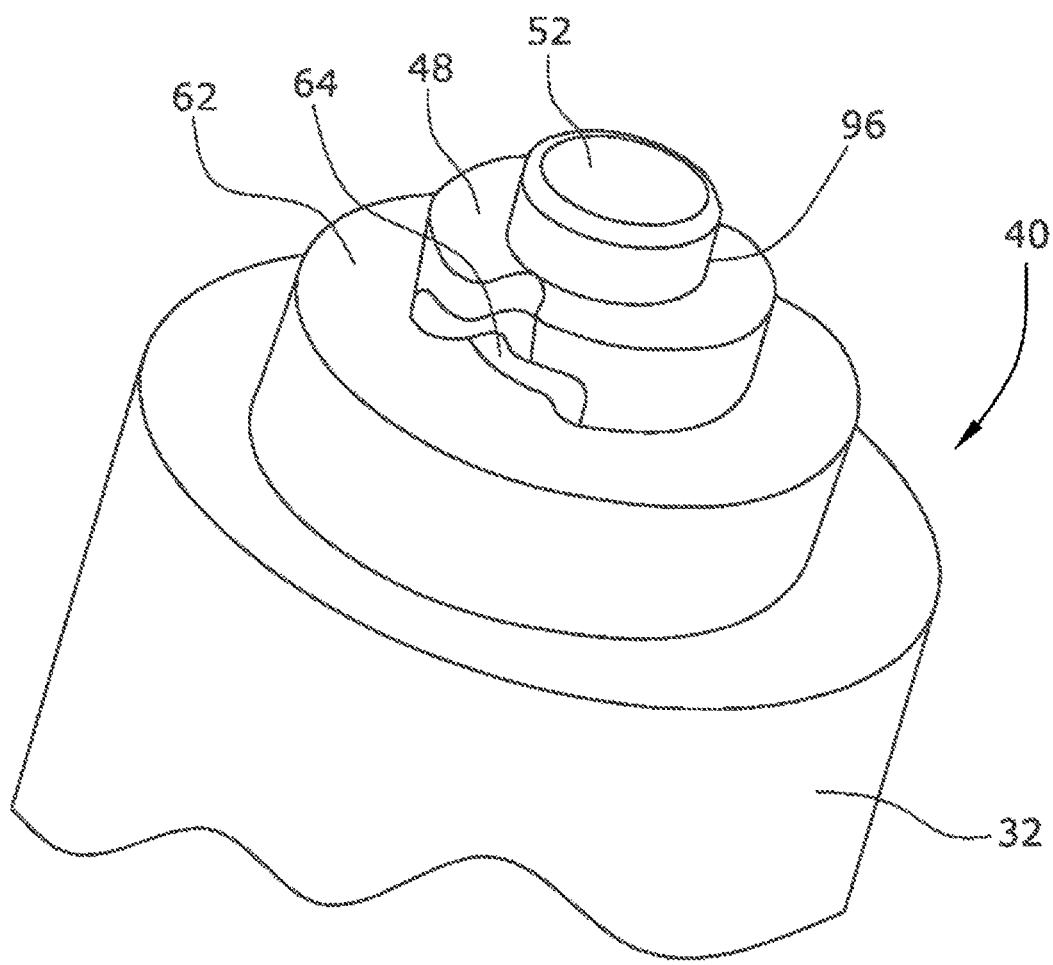
FIG. 2 shows a perspective view of a section of the movement unit of the solenoid valve from FIG. 1.

Because the valve unit has an axial contact surface against which the armature bears with its first axial end, whereby a fastening element bears on the second axial end of the armature, which is fixedly connected to the coupling member of the valve unit, the armature is clamped between the fastening element and the axial contact surface of the valve unit so that a forced entrainment of the valve unit with the armature is provided when the coil of the actuator is energized. A relative movement of the armature to the control body is accordingly excluded. The armature can accordingly be manufactured from a simply shaped and thus inexpensively producible metal part since it has a completely rotationally symmetrical approximately hollow cylindrical shape. The control body can be manufactured inexpensively from a plastic and accordingly has a low weight. The total weight of the movement unit consisting of the armature and the valve unit can thus be reduced, whereby the actuating forces can also be reduced.

With regard to the method, the object of the present invention is achieved by inserting a coupling member of the valve unit into a through hole of the armature until the armature bears with a first axial end on a contact surface of the valve unit, then inserting a fastening element into the armature and a blind hole of the coupling member arranged in the armature from a side of the armature opposite to a control body of the valve unit, then loading the fastening element in the direction of an opposite second axial end of the armature so that the armature is pressed against the contact surface of the valve unit, and finally, fastening the fastening element to the coupling member of the valve unit by welding in this position. A tight fit of the armature between the fastening element and the contact surface on the valve unit and thus the backlash-free movement coupling between the armature and the valve unit is thereby provided. The connection is easy to manufacture and reliably prevents the valve unit from unintentionally detaching from the armature even in the event of vibrations or pulsations due to the welding connection of the fastening element to the coupling member. The movement unit is thereby manufactured cost-effectively.

The fastening element can, for example, be a pin with a head that bears directly or with an interposition of a ring against the second axial end of the armature and thus forms a second contact surface on the armature. The armature is thus clamped from both axial sides, whereby the individual parts can be manufactured with very large tolerances and are easy to assemble.

Assembly is particularly easy if the pin protrudes into a blind hole of the coupling member because this can be used as a pre-fixation so as to exclude a lateral displacement between the pin and the coupling link. This avoids assembly errors.

In an advantageous further development, the valve unit and the pin are made of plastic and the pin is connected to the coupling member by welding, in particular by ultrasonic welding. Such welding provides a non-detachable material-locking connection and thus secures the rigid connection of the valve unit to the armature.

A gap can, for example, also be formed between the coupling member and the armature and at least one recess can, for example, be formed on the head of the pin or the ring arranged between the head and the armature, via which the gap is continuously fluidically connected to a space formed on the axial side of the armature opposite to the control body. Fluid for pressure equalization can thus reach the rear side of the armature from the gap via the at least one recess. The gap and also the size of the recesses are to be adapted depending on the viscosity of the controlled fluid, whereby the movement of the movement unit can, for example, not be slowed down by the forced movement of the fluid when the armature is actuated. Very short actuating times can accordingly be realized with low actuating forces.

In a more advanced embodiment of the present invention, the axial contact surface at the valve unit can, for example, have at least one recess through which the gap is fluidically connected to a space formed axially between the armature and the control body. Fluid can thus flow to the two opposite sides of the armature without having to flow through the very narrow gap between the armature and the guide sleeve which, to avoid tilting of the armature, must be made very small and thus does not allow a sufficiently fast fluid flow. The armature is thus pressure balanced.

In an embodiment of the present invention, the axial contact surface at the valve unit can, for example, have three recesses which are arranged offset by 120° to each other, which provide a firm contact of the armature on the valve unit and a uniform flow through the gap between the armature and the valve unit with a sufficient available flow cross-section.

The space between the armature and the control body is also advantageously continuously fluidically connected to the inlet via passage openings in the control body. A complete pressure and force balance with regard to the hydraulic forces is thereby achieved over the entire movement unit since the inlet pressure prevails at the entire unit.

It is also advantageous if a spring is arranged in the actuator via which the armature is loaded with the valve unit in the direction of the valve seat, whereby a first axial end of the spring bears against the head of the pin or the ring between the armature and the head of the pin. The spring displaces the valve to a safety position in the event the actuator fails, thereby ensuring a coolant flow when used, for example, as a coolant valve. The pin serves as a support for the spring so that wear of the armature is not expected.

In a more advanced embodiment of the present invention, an axial portion of the head of the pin can, for example, be radially surrounded by the spring, which allows the head to act as a guide portion for the spring, thereby reliably preventing a displacement or a buckling of the spring.

A solenoid valve is thereby provided that is balanced with regard to the hydraulic forces in all positions and which has short actuating times. This is further enhanced by the low weight of the movement unit, which can be manufactured particularly cost-effectively and simply because many lightweight plastic parts can be used.

An embodiment of a solenoid valve according to the present invention is described below under reference to the drawings using the example of a coolant valve.

The coolant valve shown in FIG. 1 consists of a housing 10, which is made in two parts, namely, a flow housing 12 with a flow channel 14 formed therein and an actuator housing 16 which is attached to the flow housing 12, in which an electromagnetic actuator 18 is arranged.

The electromagnetic actuator 18 has an electromagnetic circuit consisting of a coil 20 wound on a coil carrier 22 and which is exercisable via a plug 24, as well as a magnetizable core 26, iron ring elements 28, a yoke 30, and a movable armature 32. When the coil 20 is energized, the armature 32 is moved in the direction of the core 26 in a known manner by the resulting magnetic forces.

The armature 32 forms a movement unit 40 with a valve unit 34, which is made of plastic and which consists of a control body 36 and a coupling member 38. For this purpose, the armature 32 has an axial through-bore 42 into which the coupling member 38 projects, which is formed as a cylindrical protrusion of the control body 36 and which has a smaller axial length than the through-bore 42 of the armature 32 and a slightly smaller diameter so that a gap 44 is formed between the coupling member 38 and the armature 32 in the through-bore 42. An axially extending blind hole 46 is formed at the axial end of the coupling member 38 extending into the through bore 42 into which a fastening element 48 is inserted according to the present invention, which is fastened to the coupling member 38.

In the present embodiment, the fastening element 48 comprises a pin 50 made of plastic, which has a head 52 with an enlarged diameter. To fasten the valve unit 34 to the armature 32, the coupling member 38 is first pushed into the through-bore 42 of the armature 32 until the first axial end 54 of the armature 32 facing the control body 36 bears against an axial contact surface 56 of the valve unit 34, which is designed as a shoulder of the coupling member 38, so that the coupling member 38 projects from this contact surface 56 with an enlarged diameter in the direction of the control body 36.

The contact surface 56 has three recesses 58, which are offset by 120° from each other, so that a fluidic connection exists between the gap 44 and a space 60 which is arranged between the armature 32 and the control body 36. More or fewer recesses 58 can of course also be provided, whereby, depending on the viscosity of the fluid, flow cross-sections are to be provided which enable a rapid flow.

After the valve unit with its coupling member 38 is pushed into the through hole 42 and against the contact surface 56, the pin 50 is pressed against the second axial end 62 of the armature 32 with its head 52, or with an intermediate ring 61 surrounding the pin 50, and axially bearing against the head 52. The pin 50 thereby dips into the blind hole 46 of the coupling member 38. The armature 32 is axially clamped between the head 52 of the pin 50 and the contact surface 56 in this position so that no axial relative movement of the armature 32 to the valve unit 34 is possible. The pin 50 is welded to the coupling member 38 by ultrasonic welding and thus fixed in this position.

The head 52 of the pin 50 or the intermediate ring 61 has at least one further recess 64, via which a space 66 on the side of the armature 32 opposite the regulating body 36, and specifically between the armature 32 and a sleeve 68 in which the armature 32 is guided, is continuously fluidically connected to the gap 44 between the armature 32 and the coupling member 38.

The sleeve 68, in which the armature 32 is guided, also receives the core 26 and projects radially inside the electromagnetic actuator 18 into a housing protrusion 70 of the actuator housing 16, which projects axially into the flow housing 12. An O-ring 72 is arranged between this housing protrusion 70 and an end region of the sleeve 68, via which the radially outer region of the sleeve 68 is sealed off from the pumped coolant, so that no coolant can reach the coil 20.

The sleeve 68 also delimits the space 60 which is formed on a side of the control body 36 facing away from an inlet 74 of the flow housing 12 and axially between the control body 36 and the armature 32 and which is sealed with respect to a radial outlet 76 of the flow housing 12 via a lip seal ring 78, the closed side of which faces the radial outlet 76. The lip seal ring 78 is moved with the control body 36 and is secured by its inner leg in a radial groove 80 of the control body 36 and bears with its outer leg against the sleeve 68. The closed side of the lip seal ring 78 bears axially on a contact surface 82 of the control body 36 which is formed as a circumferential radial protrusion on the control body 36.

The space 60 is continuously connected to the inlet 74 via through-holes 84 formed in the control body 36, which are designed as axial through-holes. This connection of the inlet 74 with the space 60 does not take place completely axially via the through-holes 84, since the ends of the through-holes 84 are largely covered by a particle protection shield 86, which is formed centrally at the end of the control body 36 facing the inlet 74. The flow into the through holes 84 accordingly first takes place between the particle protection shield 86 and an axially extending annular protrusion 88 with which the control body 36 can be placed on a valve seat 90. From here, the flow is first deflected radially inwards into the passage holes 84 and from there axially into the space 60.

There is also a connection to the gap 44 between the armature 32 and the coupling member 38 via the recesses 58 at the contact surface 56 of the valve unit 34, as well as a continuous fluidic connection to the space 66 formed by the sleeve 68 and the armature 32 on the side of the armature 32 opposite to the control body 36 via the recesses 64 on the head 52 of the pin 50. The movement unit 40 is thus pressure balanced. Since the total area of the control body 36 radially inside the valve seat 90 at the inlet 74 is equal to the sum of the areas at the armature 32 and at the control body 36 on which the fluid pressure acts in the opposite direction, there is also a hydraulic force balance which results in easy actuation of the solenoid valve. The movement unit 40 is accordingly balanced in all positions with respect to the hydraulic forces due to the existing connections between the front and rear sides of the valve unit 34 and the armature 32 since the fluid can pass quickly from the inlet 74 to the opposite side of the movement unit 40 via the recesses 58, 64, the through holes 84, and the gap 44, respectively, which would not be possible at a sufficient speed via the gap between the sleeve 68 and the armature 32, since the latter must be designed with a tight clearance to prevent the armature 32 from tilting.

The only force that the electromagnetic actuator 18 must overcome when opening or closing the valve is therefore the force of a spring 92, via which the movement unit 40 is loaded in a direction away from the core 26, pressing the control body 36 onto the valve seat 90, which is formed in the flow housing 12 between the axial inlet 74 and the radial outlet 76. When current is applied to the coil 20, the magnetic force exceeds the force of the spring 92, lifting the control body 36 off the valve seat 90 and thus clearing the flow cross-section. An open safety position of the solenoid valve is thus established in the event the electromagnetic actuator 18 fails.

The spring 92 bears with its first axial end 94 against a shoulder of the head 52 of the pin 50 so that an axial section 96 of the head 52 with a smaller diameter projects into the interior of the spring 92, which bears with its opposite axial end against the core 26. The head 52 thereby forms a support surface for the spring 92 and a guide in the lower area which prevents the spring 92 from moving.

The solenoid valve according to the present invention accordingly provides for a rapid movement with low actuating forces while being very easy to manufacture since the individual parts can be produced with large tolerances and many plastic parts can be used, which can be produced easily and inexpensively by the injection molding process, even with complex molds. The solenoid valve also has a low weight due to the high proportion of plastic. The armature can also be manufactured with little effort due to the simple shape, which also saves costs.

It should be clear that the scope of protection of the present invention is not limited to the described embodiment. The contact surfaces and recesses at the head or at the coupling member, as well as the coupling member itself, can thus be shaped differently or varied in number. A separate ring can also be used between the head and the armature on which the recess is then also to be formed. Other constructive changes are of course also conceivable. Reference should also be had to the appended claims.

LIST OF REFERENCE NUMERALS

10 Housing
12 Flow housing
14 Flow channel
16 Actuator housing
18 Electromagnetic actuator
20 Coil
22 Coil carrier
24 Plug
26 Core
28 Iron ring element(s)

30 Yoke
32 Armature
34 Valve unit
36 Control body
38 Coupling member
40 Movement unit
42 Through-bore
44 Gap
46 Blind hole
48 Fastening element
50 Pin
52 Head
54 First axial end
56 Contact surface
58 Recess
60 Space
61 Intermediate ring
62 Second axial end
64 Recess
66 Space
68 Sleeve
70 Housing protrusion
72 O-ring
74 Inlet
76 Radial outlet
78 Lip seal ring
80 Radial groove
82 Contact surface
84 Through-holes
86 Particle protection shield
88 Annular protection
90 Valve seat
92 Spring
94 First axial end
96 Axial section

What is claimed is:

1. A solenoid valve for a motor vehicle, the solenoid valve comprising:
   a housing comprising an inlet and an outlet;
   a flow cross-section which is formed between the inlet and the outlet;
   a valve seat which surrounds the flow cross-section;
   a valve unit comprising an axial contact surface, a coupling member, and a control body, the valve unit being configured to be set down on the valve seat and to be lifted from the valve seat;
   an electromagnetic actuator comprising an armature which comprises a first axial end which bears against the axial contact surface of the valve unit, a second axial end, and an axial through bore which is configured to have the coupling member of the valve unit project therethrough so as to be movable with the armature; and
   a fastening element which is configured to bear on the second axial end of the armature and which is fixedly connected to the coupling member of the valve unit,
   wherein,
   the valve unit and the fastening element are provided as separate elements,
   the fastening element is a pin which comprises a head which bears directly or with an interposition of an intermediate ring against the second axial end of the armature,
   a gap is formed between the coupling member and the armature,
   a space is formed at the second axial end of the armature opposite the control body, and
   at least one recess is formed at the head of the pin or at the intermediate ring which is arranged between the head and the armature, via which at least one recess the gap is continuously fluidically connected to the space.

2. The solenoid valve as recited in claim 1, wherein,
   the coupling member comprises a blind hole, and
   the pin is configured to protrude into the blind hole of the coupling member.

3. The solenoid valve as recited in claim 2, wherein,
   the valve unit and the pin are each made of a plastic, and
   the pin is connected to the coupling member via a welding.

4. The solenoid valve as recited in claim 3, wherein the welding is an ultrasonic welding.

5. The solenoid valve as recited in claim 1, wherein
   a space is formed axially between the armature and the control body, and
   the axial contact surface of the valve unit comprises at least one recess via which a gap is fluidically connected to the space.

6. The solenoid valve as recited in claim 5, wherein the axial contact surface of the valve unit comprises three of the at least one recess which are offset by 120° from each other.

7. The solenoid valve as recited in claim 5, wherein
   the control body comprises passage openings, and
   the space between the armature and the control body is continuously fluidically connected to the inlet via the passage openings.

8. The solenoid valve as recited in claim 1, further comprising:
   a spring arranged in the actuator, the spring being configured to load the armature with the valve unit in a direction of the valve seat, the spring comprising a first axial end which bears against the head of the pin or against the intermediate ring between the armature and the head of the pin.

9. The solenoid valve as recited in claim 8, wherein the head of the pin comprises an axial portion which is radially surrounded by the spring.

10. A solenoid valve for a motor vehicle, the solenoid valve comprising:
    a housing comprising an inlet and an outlet;
    a flow cross-section which is formed between the inlet and the outlet;
    a valve seat which surrounds the flow cross-section;
    a valve unit comprising an axial contact surface, a coupling member, and a control body, the valve unit being configured to be set down on the valve seat and to be lifted from the valve seat;
    an electromagnetic actuator comprising an armature which comprises a first axial end which bears against the axial contact surface of the valve unit, a second axial end, and an axial through bore which is configured to have the coupling member of the valve unit project therethrough so as to be movable with the armature; and
    a fastening element which is configured to bear on the second axial end of the armature and which is fixedly connected to the coupling member of the valve unit,
    wherein,
    the valve unit and the fastening element are provided as separate elements,
    the fastening element is a pin which comprises a head which bears directly or with an interposition of an intermediate ring against the second axial end of the armature,
    the coupling member comprises a blind hole, the pin is configured to protrude into the blind hole of the coupling member, the valve unit and the pin are each made of a plastic, and the pin is connected to the coupling member via a welding.

11. The solenoid valve as recited in claim 10, wherein the welding is an ultrasonic welding.

12. The solenoid valve as recited in claim 10, wherein, a gap is formed between the coupling member and the armature, a space is formed at the second axial end of the armature opposite the control body, and at least one recess is formed at the head of the pin or at the intermediate ring which is arranged between the head and the armature, via which at least one recess the gap is continuously fluidically connected to the space.

13. The solenoid valve as recited in claim 10, wherein a space is formed axially between the armature and the control body, and the axial contact surface of the valve unit comprises at least one recess via which a gap is fluidically connected to the space.

14. The solenoid valve as recited in claim 13, wherein the axial contact surface of the valve unit comprises three of the at least one recess which are offset by 120° from each other.

15. The solenoid valve as recited in claim 13, wherein the control body comprises passage openings, and the space between the armature and the control body is continuously fluidically connected to the inlet via the passage openings.

16. The solenoid valve as recited in claim 10, further comprising:

a spring arranged in the actuator, the spring being configured to load the armature with the valve unit in a direction of the valve seat, the spring comprising a first axial end which bears against the head of the pin or against the intermediate ring between the armature and the head of the pin.

17. The solenoid valve as recited in claim 16, wherein the head of the pin comprises an axial portion which is radially surrounded by the spring.

18. A solenoid valve for a motor vehicle, the solenoid valve comprising:

a housing comprising an inlet and an outlet;

a flow cross-section which is formed between the inlet and the outlet;

a valve seat which surrounds the flow cross-section;

a valve unit comprising an axial contact surface, a coupling member, and a control body, the valve unit being configured to be set down on the valve seat and to be lifted from the valve seat;

an electromagnetic actuator comprising an armature which comprises a first axial end which bears against the axial contact surface of the valve unit, a second axial end, and an axial through bore which is configured to have the coupling member of the valve unit project therethrough so as to be movable with the armature; and a fastening element which is configured to bear on the second axial end of the armature and which is fixedly connected to the coupling member of the valve unit, wherein, the valve unit and the fastening element are provided as separate elements, the fastening element is a pin which comprises a head which bears directly or with an interposition of an intermediate ring against the second axial end of the armature, a space is formed axially between the armature and the control body, and the axial contact surface of the valve unit comprises at least one recess via which a gap is fluidically connected to the space.

19. The solenoid valve as recited in claim 18, wherein, the coupling member comprises a blind hole, and the pin is configured to protrude into the blind hole of the coupling member.

20. The solenoid valve as recited in claim 19, wherein, the valve unit and the pin are each made of a plastic, and the pin is connected to the coupling member via a welding.

21. The solenoid valve as recited in claim 20, wherein the welding is an ultrasonic welding.

22. The solenoid valve as recited in claim 18, wherein, a gap is formed between the coupling member and the armature, a space is formed at the second axial end of the armature opposite the control body, and at least one recess is formed at the head of the pin or at the intermediate ring which is arranged between the head and the armature, via which at least one recess the gap is continuously fluidically connected to the space.

23. The solenoid valve as recited in claim 18, wherein the axial contact surface of the valve unit comprises three of the at least one recess which are offset by 120° from each other.

24. The solenoid valve as recited in claim 18, wherein the control body comprises passage openings, and the space between the armature and the control body is continuously fluidically connected to the inlet via the passage openings.

25. The solenoid valve as recited in claim 18, further comprising:

a spring arranged in the actuator, the spring being configured to load the armature with the valve unit in a direction of the valve seat, the spring comprising a first axial end which bears against the head of the pin or against the intermediate ring between the armature and the head of the pin.

26. The solenoid valve as recited in claim 25, wherein the head of the pin comprises an axial portion which is radially surrounded by the spring.

27. A method for producing a movement unit which comprises an armature and a valve unit for a solenoid valve, the method comprising:

inserting a coupling member of the valve unit into a through-bore of the armature until the armature bears with a first axial end on a contact surface of the valve unit;

inserting a fastening element into the armature and into a blind hole of the coupling member which is arranged in the armature from a first axial side of the armature which is opposite to a control body of the valve unit;

loading the fastening element towards a second axial end of the armature which is opposite to the first axial end so that the armature is pressed against the contact surface of the valve unit; and fixing the fastening element to the coupling member of the valve unit via a welding.

* * * * *